United States Patent
Chang

(10) Patent No.: US 8,751,929 B2
(45) Date of Patent: Jun. 10, 2014

(54) MACHINE-IMPLEMENTED DATA CONVERSION METHOD FOR A BILL OF MATERIALS

(75) Inventor: Meng-Ling Chang, Nan-Tou Hsien (TW)

(73) Assignees: Universal Scientific Industrial (Shanghai) Co., Ltd., Shanghai (CN); Universal Global Scientific Industrial Co., Ltd., Nantou (TW)

( * ) Notice: Subject to any disclaimer, the term of this patent is extended or adjusted under 35 U.S.C. 154(b) by 1533 days.

(21) Appl. No.: 12/051,277

(22) Filed: Mar. 19, 2008

(65) Prior Publication Data

US 2009/0241022 A1 Sep. 24, 2009

(51) Int. Cl.
G06F 17/24 (2006.01)
G06F 17/50 (2006.01)

(52) U.S. Cl.
USPC .......... 715/271; 715/255; 715/965; 705/7.26; 705/29

(58) Field of Classification Search
USPC .......................... 715/200, 211–220, 255–256
See application file for complete search history.

(56) References Cited

U.S. PATENT DOCUMENTS

| | | | | |
|---|---|---|---|---|
| 4,827,423 A | * | 5/1989 | Beasley et al. | 700/96 |
| 5,119,307 A | * | 6/1992 | Blaha et al. | 700/107 |
| 5,852,796 A | * | 12/1998 | Stepanenko, Jr. | 702/176 |
| 5,970,465 A | * | 10/1999 | Dietrich et al. | 705/7.22 |
| 6,493,679 B1 | * | 12/2002 | Rappaport et al. | 705/29 |
| 6,850,904 B2 | * | 2/2005 | Ballas et al. | 705/29 |
| 7,043,324 B2 | * | 5/2006 | Woehler | 700/107 |
| 7,058,587 B1 | * | 6/2006 | Horne | 705/7.22 |
| 7,200,454 B2 | * | 4/2007 | Coppola et al. | 700/105 |
| 7,209,869 B1 | * | 4/2007 | Kroger et al. | 703/1 |
| 7,596,518 B2 | * | 9/2009 | Rappaport et al. | 705/29 |
| 2001/0047322 A1 | * | 11/2001 | Plate et al. | 705/37 |
| 2002/0049767 A1 | * | 4/2002 | Bennett | 707/104.1 |
| 2002/0184111 A1 | * | 12/2002 | Swanson | 705/26 |
| 2003/0050878 A1 | * | 3/2003 | Rappaport et al. | 705/34 |
| 2003/0150909 A1 | * | 8/2003 | Markham et al. | 235/376 |
| 2003/0220852 A1 | * | 11/2003 | Back et al. | 705/29 |
| 2003/0220853 A1 | * | 11/2003 | Back et al. | 705/29 |
| 2004/0093336 A1 | * | 5/2004 | Hu et al. | 707/100 |
| 2004/0267396 A1 | * | 12/2004 | Coppola et al. | 700/105 |
| 2007/0240154 A1 | * | 10/2007 | Gerzymisch et al. | 717/174 |

OTHER PUBLICATIONS

Kalagnanam et al. "A system for automated mapping of bill-of-materials part numbers", ACM, Aug. 22-25, 2004, pp. 805-810.*

* cited by examiner

*Primary Examiner* — Maikhanh Nguyen
(74) *Attorney, Agent, or Firm* — Bacon & Thomas, PLLC

(57) ABSTRACT

A machine-implemented method for data conversion, which is adapted for converting a plurality of entries of component data in a bill of materials, includes the steps of: (a) reading the entries of the component data from the bill of materials; (b) acquiring a critical text set from each of the entries of the component data; (c) generating a converted component value and a converted component value range for the critical text set acquired from each of the entries of the component data; and (d) rearranging the entries of the component data in the bill of materials according to the converted component values, and displaying the rearranged entries of the component data together with the corresponding converted component values and the corresponding converted component value ranges.

14 Claims, 4 Drawing Sheets

| 31 | 32 | 33 | 34 |
|---|---|---|---|
| CER CHIP C 0.022U 10% X7R 0603 50V L/F | 0.022U | | 19.8-24.2n |
| CER CHIP C 0.01U 10% X7R 0402 16V | 0.01U | U | 9-11n |
| CER CHIP C 470P 5% NPO 0603 50V W/LF | 470P | P | 446.5-493.5P |
| CER CHIP C 3900PF 10% NPO 0603 50V L/F | 3900P | P | 3510-4290P |
| CER CHIP C 3300P 10% X7R 0603 50V L/F | 3300P | P | 2970-3630P |
| CER CHIP C 330P 5% NPO 0603 50V | 330P | P | 313.5-346.5P |
| CER CHIP C 33P 5% NPO 0603 50V W/LF | 33P | P | 31.35-34.65P |
| CER CHIP C 2200P 10% X7R 0603 50V | 2200P | P | 1980-2420P |

FIG. 6

MACHINE-IMPLEMENTED DATA CONVERSION METHOD FOR A BILL OF MATERIALS

BACKGROUND OF THE INVENTION

1. Field of the Invention

This invention relates to a machine-implemented method for data conversion, more particularly to a machine-implemented method adapted for converting a plurality of entries of component data in a bill of materials.

2. Description of the Related Art

A bill of materials generated by current Product Data Management (PDM) software, such as that available from the U.S. based company Agile, often contains text content that is difficult for personnel such as engineers to reference. For example, text content such as "optional material number" is irrelevant to engineers seeking capacitance or resistance data. Moreover, entries of component data are not presented in an order that facilitates data look-up. Furthermore, although the aforementioned software is capable of displaying a value range of a specified component data value, the value range is not always displayed in a suitable format. For example, for a capacitor having a capacitance value range of '0.1U±10%', the aforementioned software converts the value range to '0.0900-0.1100', while the format '90-110n' is actually more useful to engineers. As such, there is a need to present the entries of the component data in a bill of materials in a manner that is more easily referenced, and that reduces the need for manual conversion of component data values.

SUMMARY OF THE INVENTION

Therefore, an object of the present invention is to provide a method for converting a plurality of entries of component data in a bill of materials that is capable of overcoming the aforementioned drawbacks of the prior art.

According to the present invention, there is provided a machine-implemented method for data conversion, the machine-implemented method being adapted for converting a plurality of entries of component data in a bill of materials, and comprising the steps of:

(a) reading the entries of the component data from the bill of materials;

(b) acquiring a critical text set from each of the entries of the component data;

(c) generating a converted component value and a converted component value range for the critical text set acquired from each of the entries of the component data; and (d) rearranging the entries of the component data in the bill of materials according to the converted component values, and displaying the rearranged entries of the component data together with the corresponding converted component values and the corresponding converted component value ranges.

BRIEF DESCRIPTION OF THE DRAWINGS

Other features and advantages of the present invention will become apparent in the following detailed description of the preferred embodiment with reference to the accompanying drawings, of which:

FIG. 6 is a schematic diagram illustrating a display of the entries of the component data rearranged according to converted component values and classified according to classifications of the component data in accordance with the method of the preferred embodiment.

DETAILED DESCRIPTION OF THE PREFERRED EMBODIMENT

The preferred embodiment of a machine-implemented method adapted for converting a plurality of entries of component data in a bill of materials according to the present invention comprises the steps of: reading the entries of the component data from the bill of materials; acquiring a critical text set 24 (see FIG. 5) from each of the entries of the component data; generating a converted component value 32 (see FIG. 6) and a converted component value range 34 (see FIG. 6) for the critical text set 24 acquired from each of the entries of the component data; and rearranging the entries of the component data in the bill of materials according to the converted component values 32, and displaying the rearranged entries of the component data together with the corresponding converted component values and the corresponding converted component value ranges.

Figure 1:
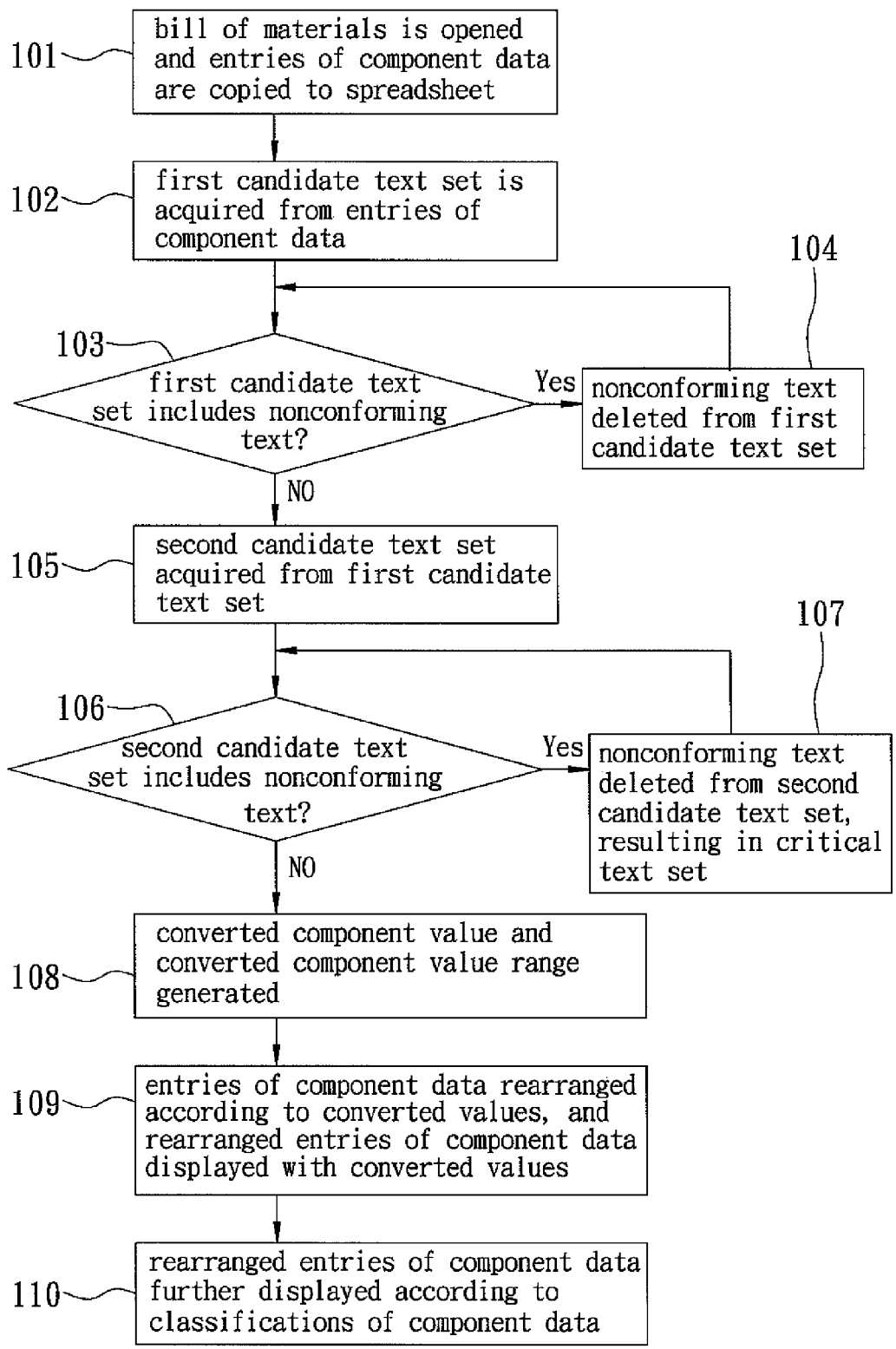
FIG. 1 is a flow chart of a preferred embodiment of a machine-implemented method for data conversion for a bill of materials according to the present invention.

Preferably, the method is realized using a machine that executes a macro software tool, more particularly, a macro software tool in a spreadsheet application. Alternatively, a computer readable data storage medium that comprises program instructions for causing a computer to perform consecutive steps of the machine-implemented method may be used. In yet another alternative, the aforementioned program instructions may constitute a macro software tool, more particularly, a macro software tool in a spreadsheet application. The preferred embodiment of the machine-implemented method illustrated in FIG. 1 is realized by a macro software tool in Microsoft Excel. However, the manner in which the method is realized is not limited to what is disclosed herein.

Referring to FIG. 1, in step 101, a bill of materials table is opened, and the entries of the component data are copied to a spreadsheet. In this embodiment, the bill of materials is one created using PDM software provided by Agile, a U.S. based company.

Preferably, acquisition of the critical text set 24 includes the sub-steps of: acquiring a candidate text set from each of the entries of the component data according to a predefined text acquiring rule set; determining whether the candidate text set acquired from each of the entries of the component data includes text that does not conform with a predefined text format rule set; and deleting the text from the candidate text set acquired from each of the entries of the component data and not conforming with the predefined text format rule set so as to result in the critical text set 24 for each of the entries of the component data. Preferably, each of the entries of the component data includes a component description field 21 (see FIG. 2), from which the candidate text set is acquired according to the predefined text-acquiring rule set.

In this embodiment, the aforementioned sub-steps are performed in the following manner: a first candidate text set is acquired from the component description field 21 according to a predefined text-acquiring rule set, and text included in the first candidate text set that is determined as not conforming with the predefined text format rule set is deleted; and from the first candidate text set, a second candidate text set is acquired according to the predefined text-acquiring rule set, and text included in the second candidate text set that is determined as not conforming with the predefined text format rule set is deleted so as to result in the critical text set 24 for each of the entries of component data.

Figure 5:
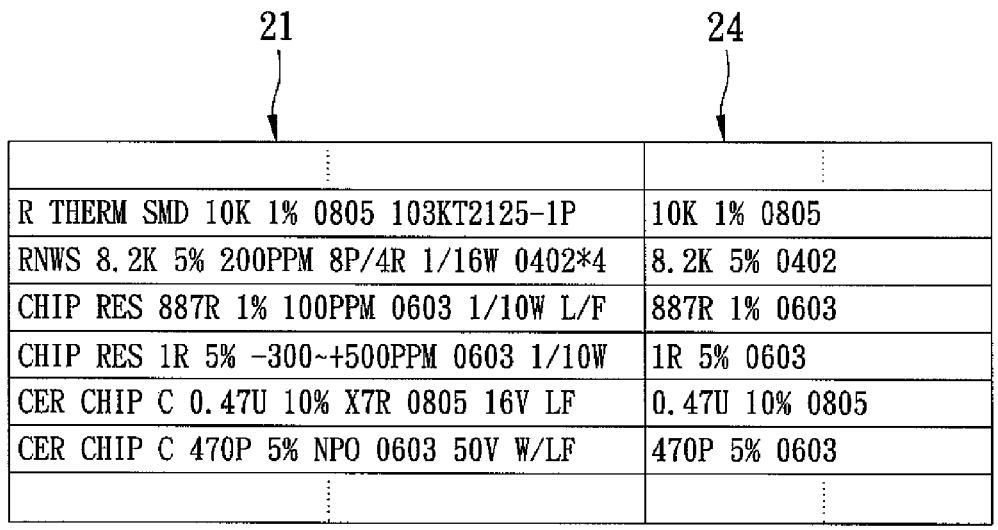
FIG. 5 is a schematic diagram illustrating the second candidate text set after deletion of text not conforming to the predefined text format rule set according to the method of the preferred embodiment.

Referring to FIG. 5, the critical text set 24 acquired through the method of the preferred embodiment preferably includes a component value text and a tolerance text. In this embodiment, for the entries of the component data referring to a capacitor, a corresponding critical text set 24 includes a 'capacitance text', a 'tolerance text', and a 'capacitor package size' which have the following corresponding formats: 'digits plus capacitance unit' (such as 0.47U, etc.), 'digits plus character "%"' (such as 10%, etc.) and 'four consecutive digits' (such as 0805, etc.). For the entries of the component data referring to a resistor, a critical text set 24 includes a 'resistance text', a 'tolerance text', and a 'resistor package size', which have the corresponding text formats: 'digits plus resistance unit' (such as 10K, etc.), 'digits plus character "%"' (such as 1%, etc.) and 'four consecutive digits' (such as 0805, etc.). In this case, the text-acquiring rule set and the text format rule set are predefined by the user in such a way that the critical text set 24 thus acquired accordingly includes the abovementioned text sets and corresponding text formats.

Figure 2:
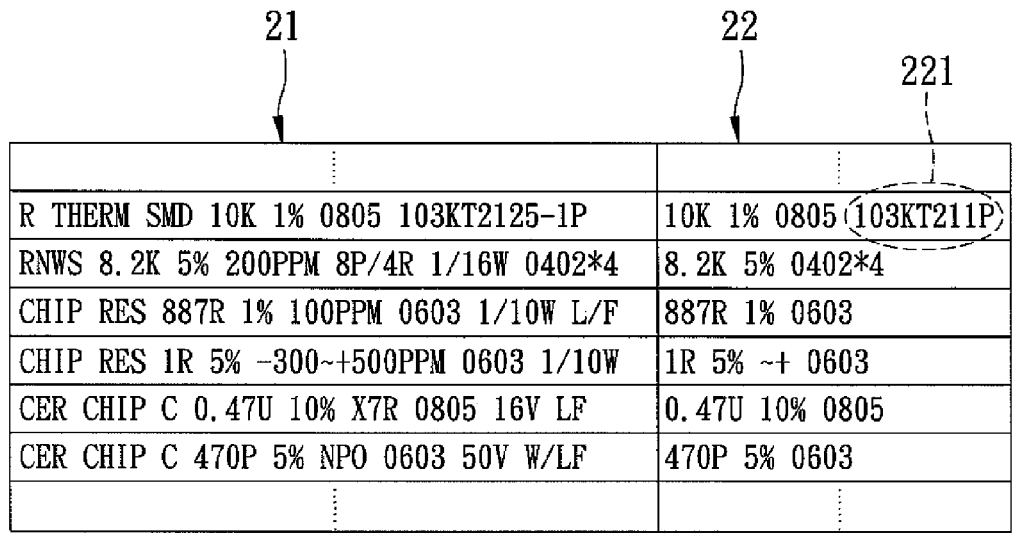
FIG. 2 is a schematic diagram illustrating a first candidate text set acquired from each of the entries of the component data in the bill of materials according to the method of the preferred embodiment.
Figure 3:
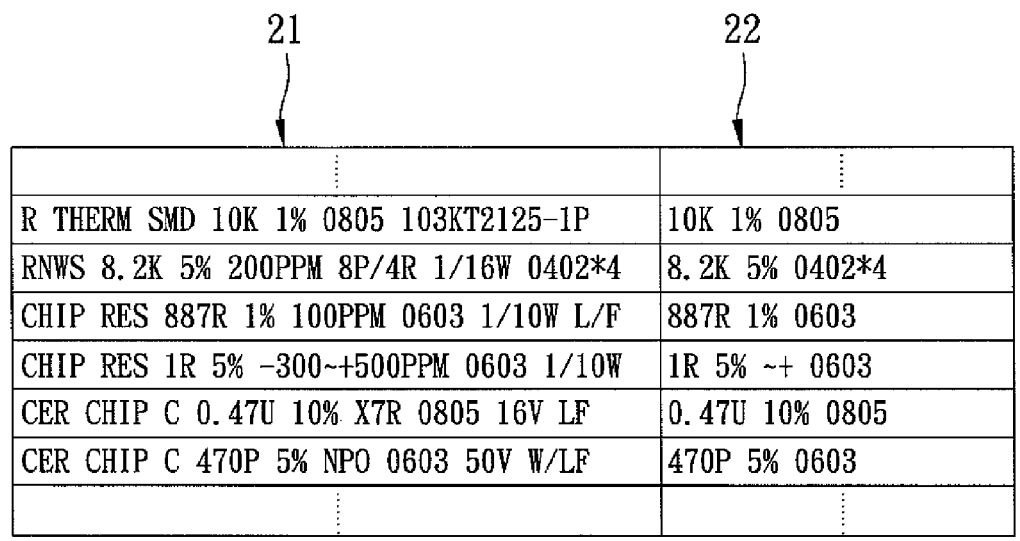
FIG. 3 is a schematic diagram illustrating the first candidate text set after deletion of text not conforming to a predefined text format rule set according to the method of the preferred embodiment.

Referring to FIGS. 1 to 3, in step 102, from the component description field 21 of each of the entries of the component data, a first candidate text set 22 is acquired according to the predefined text-acquiring rule set. In a first example of a component description field 21 containing 'R THERM SMD 10K 1% 0805 103KT2125-1P', a first candidate text set 22 including '10K', '1%', '0805' and '103KT21P' is acquired.

In step 103, it is determined whether the first candidate text set 22 acquired in step 102 includes text not conforming to the predefined text format rule set. In the affirmative, the flow proceeds to step 104. Otherwise, the flow proceeds to step 105. In the above first example it is determined that in the first candidate text set 22 including '10K', '1%', '0805' and '103KT21P', the text 221 '103KT21P' does not conform with the predefined text format rule set.

In step 104, text 221 is deleted from the first candidate text set 22 acquired from the component description field 21 of each of the entries of the component data and not conforming with the predefined text format rule set. In the above first example, from the first candidate text set 22 including '10K', '1%', '0805' and '103KT21P', the text '103KT21P' 221 that is determined as not conforming with the predefined text format rule set is deleted. The resultant first candidate text set includes '10k', '1%', and '0805'.

Figure 4:
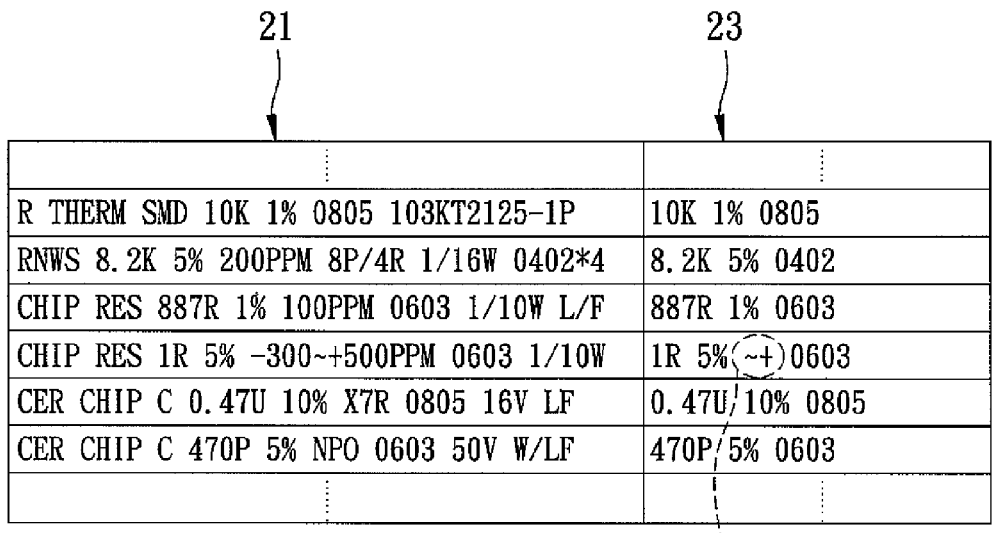
FIG. 4 is a schematic diagram illustrating a second candidate text set acquired from the first candidate text set according to the method of the preferred embodiment.

Referring to FIGS. 1, 3, and 4, in step 105, from the first candidate text set 22, a second candidate text set 23 is acquired for each of the entries of the component data. In a second example of a first candidate text set 22 including '8.2K', '5%', and '0402*4', a second candidate text set 23 including only '8.2K', '5%', and '0402' is acquired.

In step 106, it is determined whether the second candidate text set 23 acquired in step 105 includes text not conforming to the predefined text format rule set. In the affirmative, the flow proceeds to step 107. Otherwise, the flow proceeds to step 108. In a third example of the second candidate text set including '1R', '5%', '~+', and '0603', the text '~+' 231 is determined not to conform with the predefined text format rule set.

In step 107, text 231 included in the second candidate text set 23 acquired from the first candidate text set 22 and not conforming with the predefined text format rule set is deleted. In the above third example, in the second candidate text set 23 including '1R', '5%', '~+', and '0603', the text '~+' 231 that is determined as not conforming with the predefined text format rule set is deleted. The resultant second candidate text set 23 includes '1R', '5%', and '0603'.

Referring to FIGS. 1, 5, and 6, after completion of steps 102 through 107, the second candidate text set 23 results in the critical text set 24, which includes the component value text and the tolerance text. For example, in the critical text set 24 including '10K', '1%', and '0805', '10K' is the component value text, and '1%' is the tolerance text.

In step 108, from the component value text and the tolerance text of each critical text set 24 for each of the entries of the component data, a corresponding converted component value 32, and a corresponding converted component value range 34 are generated, wherein the corresponding converted component value 32 is preferably one of a capacitance value, a resistance value, and an inductance value. For example, with reference to FIG. 6, for an entry of the component data referring to a capacitor, for which the critical text set 24 includes '470P', '5%', and '0603', in which '470P' is the component value text and '5%' is the tolerance text, the corresponding converted component value 32 of '470P' and the corresponding converted component value range 34 of '446.5-493.5P' are generated, wherein the converted component value 32 of '470P' is a capacitance value.

In step 109, the entries of the component data are rearranged according to the converted component values, and the rearranged entries of the component data are displayed together with the corresponding converted component values and the corresponding component value ranges. In this embodiment, a unit field 33 containing text that stands for a unit of the converted component value is displayed following the converted component value field 32. Of the text values contained in the unit fields 33 shown in FIG. 6, 'U' stands for micro; 'n' stands for nano, i.e., $10^{-9}$; and 'P' stands for pico, i.e., $10^{-12}$. In this embodiment, the entries of the component data are rearranged in descending order according to the unit of the converted component value 32, in this case 'U', 'n', and 'P', and the rearranged entries of the component data are displayed together with the corresponding converted component values. In practice, the sorting algorithm can be configured by the user, and hence is not limited to what is disclosed herein.

Preferably, in step 110, the rearranged entries of the component data are further displayed according to classifications of the component data. In this embodiment, the entries of the component data are classified according to the value of the unit field 33 of the converted component value 32, which in this case identifies each of the entries of the component data as one of capacitor component data and resistor component data, and are displayed accordingly. Taking the entry of the component data in which the component description field 31 contains 'CER CHIP C 0.022U 10% X7R 0603 50V L/F' as an example, the unit field 33 value of 'U' identifies the entry as one of capacitor component data, and the entry is displayed accordingly. In this embodiment, differently classified component data are displayed on separate worksheets. Capacitor component data, for example, is displayed on a separate worksheet 3.

With further reference to FIG. 6, the converted component value 32 and converted component value range 34 of the entries of the component data are formatted for display according to the preferences of the user. For example, for an entry of the component data having a component description field 31 containing 'CER CHIP C 0.22U 10% X7R 0603 50V L/F', the displayed corresponding converted component value 32 is '0.022U', and the displayed converted component data value range 34 is '19.8-24.2n'. The format of the converted component data value range 34 '19.8-24.2n' is in this case preferred to a format of '0.022±10%'. The format according to which the converted component values are displayed is configurable by the user, and is not limited to what is disclosed herein.

It has thus been shown that the machine-implemented method for data conversion adapted for converting a plurality of entries of component data in a bill of materials according to the present invention can display entries of component data in an easily referenced format. While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for data conversion, said method being adapted for converting a plurality of entries of component data in a bill of materials, the method being performed by a computer machine according to computer program instructions to execute steps of:
   (a) reading the entries of the component data from the bill of materials;
   (b) acquiring a critical text set from each of the entries of the component data, wherein the critical text set includes a component value text and a tolerance text, by:
   (b-1) acquiring a candidate text set from each of the entries of the component data according to a predefined text-acquiring rule set;
   (b-2) determining whether the candidate text set acquired from each of the entries of the component data includes text that does not conform with a predefined text format rule set; and
   (b-3) deleting the text from the candidate text set acquired from each of the entries of the component data and not conforming with the predefined text format rule set so as to result in the critical text set for each of the entries of the component data;
   (c) generating a converted component value and a converted component value range for the critical text set acquired from each of the entries of the component data; and
   (d) rearranging the entries of the component data in the bill of materials according to the converted component values, and displaying the rearranged entries of the component data together with the corresponding converted component values and the corresponding converted component value ranges.

2. The method as claimed in claim 1, wherein the rearranged entries of the component data are further displayed in step (d) according to classifications of the entries of the component data.

3. The method as claimed in claim 1, wherein said machine-implemented method is realized using a machine that executes a macro software tool.

4. The method as claimed in claim 1, wherein said machine-implemented method is realized using a machine that executes a macro software tool in a spreadsheet application.

5. The method as claimed in claim 1, wherein each of the entries of the component data includes a component description field, and in sub-step (b-1), the candidate text set is acquired from a component description field of each of the entries of the component data.

6. The method as claimed in claim 1, wherein the converted component value is one of a capacitance value, a resistance value, and an inductance value.

7. The method as claimed in claim 1, wherein a unit field is generated for the converted component value in step (c).

8. A non-transitory computer readable data storage medium comprising program instructions for causing a computer to perform consecutive steps of a machine-implemented method for data conversion, said machine-implemented method being adapted for converting a plurality of entries of component data in a bill of materials, and comprising the steps of:
   (a) reading the entries of the component data from the bill of materials;
   (b) acquiring a critical text set from each of the entries of the component data, wherein the critical text set includes a component value text and a tolerance text, by:
   (b-1) acquiring a candidate text set from each of the entries of the component data according to a predefined text-acquiring rule set;
   (b-2) determining whether the candidate text set acquired from each of the entries of the component data includes text that does not conform with a predefined text format rule set; and
   (b-3) deleting the text from the candidate text set acquired from each of the entries of the component data and not conforming with the predefined text format rule set so as to result in the critical text set for each of the entries of the component data;
   (c) generating a converted component value and a converted component value range for the critical text set acquired from each of the entries of the component data; and
   (d) rearranging the entries of the component data in the bill of materials according to the converted component values, and displaying the rearranged entries of the component data together with the corresponding converted component values and the corresponding converted component value ranges.

9. The non-transitory computer readable data storage medium as claimed in claim 8, wherein, in step (d), the rearranged entries of the component data are further displayed according to classifications of the entries of the component data.

10. The non-transitory computer readable data storage medium as claimed in claim 8, wherein said program instructions constitute a macro software tool.

11. The non-transitory computer readable data storage medium as claimed in claim 8, wherein said program instructions constitute a macro software tool in a spreadsheet application.

12. The non-transitory computer readable data storage medium as claimed in claim 8, wherein each of the entries of the component data includes a component description field, and in sub-step (b-1) of the machine-implemented method, the candidate text set is acquired from the component description field of each of the entries of the component data.

13. The non-transitory computer readable data storage medium as claimed in claim 8, wherein the converted component value is one of a capacitance value, a resistance value, and an inductance value.

14. The non-transitory computer readable data storage medium as claimed in claim 8, wherein a unit field is generated for the converted component value in step (c).

* * * * *